United States Patent
Wang et al.

(10) Patent No.: US 10,948,987 B2
(45) Date of Patent: Mar. 16, 2021

(54) LIGHT GUIDING COMPONENT AND MANUFACTURING METHOD THEREOF, EYEBALL TRACKING MODULE AND METHOD, VIDEO EYEGLASS

(71) Applicants: Beijing BOE Optoelectronics Technology Co., Ltd., Beijing (CN); BOE TECHNOLOGY GROUP CO., LTD., Beijing (CN)

(72) Inventors: Chenru Wang, Beijing (CN); Hao Zhang, Beijing (CN); Yali Liu, Beijing (CN); Ruijun Dong, Beijing (CN); Xuebing Zhang, Beijing (CN); Ke Li, Beijing (CN); Lili Chen, Beijing (CN); Zhanshan Ma, Beijing (CN)

(73) Assignees: Beijing BOE Optoelectronics Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 69 days.

(21) Appl. No.: 16/384,634

(22) Filed: Apr. 15, 2019

(65) Prior Publication Data

US 2020/0073473 A1    Mar. 5, 2020

(30) Foreign Application Priority Data

Sep. 3, 2018    (CN) .......................... 201811022730.6

(51) Int. Cl.
G02F 1/1343    (2006.01)
G06F 3/01    (2006.01)
F21V 8/00    (2006.01)

(52) U.S. Cl.
CPC .............. *G06F 3/013* (2013.01); *G02B 6/003* (2013.01); *G02F 1/1343* (2013.01)

(58) Field of Classification Search
None
See application file for complete search history.

(56) References Cited

U.S. PATENT DOCUMENTS

2013/0044130 A1* 2/2013 Geisner ................... G06F 3/002
                                                              345/633
2013/0271445 A1* 10/2013 Park ....................... G02F 1/1347
                                                              345/212

(Continued)

FOREIGN PATENT DOCUMENTS

CN    102955255 A    3/2013
CN    103279237 A    9/2013

(Continued)

OTHER PUBLICATIONS

First Office Action for CN Patent Application No. 201811022730.6 dated Oct. 30, 2020.

*Primary Examiner* — Eileen M Adams
(74) *Attorney, Agent, or Firm* — Thomas|Horstemeyer, LLP

(57) ABSTRACT

A light guiding component is provided in an eyeball tracking module which includes a first substrate and a second substrate disposed opposite to each other, a first electrode disposed on the first substrate, a second electrode disposed on the second substrate, and at least one liquid crystal structure disposed between the first electrode and the second electrode. The liquid crystal structure includes liquid crystal molecules. The first electrode and the second electrode are configured to control a deflection direction of the liquid crystal molecules with an applied voltage, such that a light ray incident to the light guiding component, which meets a threshold condition, is emitted along a predetermined direction.

16 Claims, 7 Drawing Sheets

(56) References Cited

U.S. PATENT DOCUMENTS

2014/0146246 A1* 5/2014 Ma .......................... G06F 3/041
                                                    349/12
2020/0257133 A1* 8/2020 An ....................... H04N 13/356

FOREIGN PATENT DOCUMENTS

CN      103376595 A    10/2013
EP        3149541 A1    4/2017

* cited by examiner

LIGHT GUIDING COMPONENT AND MANUFACTURING METHOD THEREOF, EYEBALL TRACKING MODULE AND METHOD, VIDEO EYEGLASS

CROSS-REFERENCE TO RELATED APPLICATIONS

The present application claims the benefit of and priority to Chinese Patent Application No. 201811022730.6 filed Sep. 3, 2018, the entire contents of which are incorporated herein by reference.

FIELD OF THE INVENTION

The present disclosure relates to the field of human interaction technology, and more particularly to a light guiding component and a manufacturing method thereof, an eyeball tracking module and eyeball tracking method, and a video eyeglass.

BACKGROUND

Eyeball tracking technology is a technique that utilizes various detection methods such as mechanical, electronic, and optical to obtain a current "gaze direction" of a subject. With the rapid development of computer vision, artificial intelligence technology, and digital technology, eye tracking technology has become a hot research field, and has been widely used in the field of human-computer interaction. For example, it can be applied to virtual reality, augmented reality, vehicle assisted driving, user experience, cognitive impairment diagnosis and other fields.

BRIEF SUMMARY

Embodiments of the present disclosure provide a light guiding component and a manufacturing method thereof, as well as an eyeball tracking module and method.

An embodiment of the present disclosure includes a light guiding component provided in an eyeball tracking module, the light guiding component including: a first substrate and a second substrate disposed opposite to each other, a first electrode disposed on the first substrate, a second electrode disposed on the second substrate, and at least one liquid crystal structure disposed between the first electrode and the second electrode, the liquid crystal structure including liquid crystal molecules;

The first electrode and the second electrode are configured to control a deflection direction of the liquid crystal molecules with an applied voltage, so that a light ray incident to the light guiding component, which meets a threshold condition, is emitted along a predetermined direction.

In an example embodiment, each liquid crystal structure includes: first liquid crystal cells arranged in an array and second liquid crystal cells arranged in an array;

the first liquid crystal cells and the second liquid crystal cells are parallel to each other and are disposed obliquely with respect to the first substrate; the first liquid crystal cells and the second liquid crystal cells being alternately disposed; and a refractive index of the first liquid crystal cell is greater than a refractive index of the second liquid crystal cell.

In an example embodiment, the first electrode is disposed on a side of the first substrate adjacent to the second substrate, and the second electrode is disposed on a side of the second substrate adjacent to the first substrate;

wherein the first electrode and the second electrode are both transparent electrodes.

In an example embodiment, the threshold condition is that a light incident angle is equal to a threshold angle; and the threshold angles of the at least one liquid crystal structure are different.

In an example embodiment, the light guiding component further includes: a sealant disposed between the first substrate and the second substrate;

wherein the sealant is configured to bond the first substrate and the second substrate.

In an example embodiment, an interval between adjacent first liquid crystal cells is 1 to 10 nanometers, and an interval between adjacent second liquid crystal cells is 1 to 10 nanometers.

An embodiment of the present disclosure provides an eyeball tracking module, provided in video eyeglasses, the eyeball tracking module including: a transmitting component, the light guiding component described above, a receiving component, and a main control component;

wherein the transmitting component is configured to emit invisible light to the light guiding component;

the light guiding component is configured to emit out the invisible light incident to the light guiding component along a predetermined direction;

the receiving component is configured to receive the invisible light reflected off an eyeball, and generate an electrical signal under illumination of the invisible light; and the main control component is configured to receive the electrical signal, and obtain a position of the eyeball according to the electrical signal.

In an example embodiment, the transmitting component includes: at least one invisible light source; and the invisible light source is disposed at an edge of the light guiding component and is connected to the main control component.

In an example embodiment, the video eyeglass includes: a lens;

the light guiding component is disposed at one side of the lens;

the receiving component is disposed on a side of the light guiding component away from the lens.

In an example embodiment, the receiving component includes: a third electrode and a fourth electrode disposed opposite to each other, and a photosensitive layer disposed between the third electrode and the fourth electrode; and the photosensitive layer is configured to generate an electrical signal under illumination of invisible light; and the third electrode and the fourth electrode are transparent electrodes and are connected to the main control component and configured to transmit the electrical signal to the main control component.

In an example embodiment, the light guiding component includes: a first electrode and a second electrode; and the first electrode and the second electrode are connected to the main control component.

An embodiment of the present disclosure provides video eyeglasses including the eyeball tracking module described above.

An embodiment of the present disclosure provides a method for manufacturing a light guiding component, including:

providing a first substrate, forming a first electrode on the first substrate;

forming at least one liquid crystal structure on the first electrode;

providing a second substrate, forming a second electrode on the second substrate; the first electrode and the second electrode are configured to control a deflection direction of the liquid crystal molecules with an applied voltage, so that a light ray incident to the light guiding component, which meets a threshold condition, is emitted along a predetermined direction; and disposing the second substrate on which the second electrode is formed on the liquid crystal structure.

In an example embodiment, forming at least one liquid crystal structure on the first electrode includes:

coating a liquid crystal material including a first liquid crystal material and a second liquid crystal material on the first electrode; and performing light exposure on the liquid crystal material with a mask to form a liquid crystal structure including the first liquid crystal cell and the second liquid crystal cell, wherein the first liquid crystal cell and the second liquid crystal cell are parallel to each other and disposed obliquely with respect to the first substrate; and the first liquid crystal cells and the second liquid crystal cells are alternately disposed In an example embodiment, after the second substrate on which the second electrode is formed is disposed on the liquid crystal structure, the method further includes:

coating a sealant for bonding the first substrate and the second substrate between the first substrate and the second substrate.

An embodiment of the present disclosure provides an eyeball tracking method, implemented with the eyeball tracking module described above, the method including:

receiving an electrical signal; and obtaining a position of an eyeball according to the electrical signal.

Other features and advantages of the present disclosure will be set forth in the description below, and partly become apparent from the description, or may be understood from practice of the present disclosure. The objectives and other advantages of the present disclosure may be realized and obtained by means of the structure particularly pointed in the description, claims, and accompanying drawings.

BRIEF DESCRIPTION OF THE DRAWINGS

The accompanying drawings are provided for further understanding of the technical solutions of the present disclosure which constitute a part of this specification and, together with the embodiments of the present application, serve to explain the technical solution of the present disclosure and do not constitute a limitation on the technical solutions of the present disclosure.

DETAILED DESCRIPTION

Figure 1:
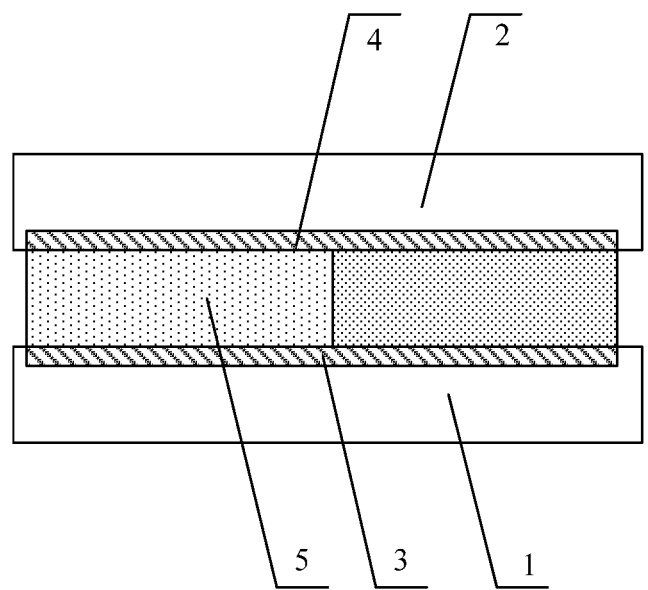
FIG. 1 is a schematic structural diagram of a light guiding component according to an embodiment of the present disclosure.

In order to make the objectives, technical solutions and advantages of the present disclosure more clear, the embodiments of the present disclosure will be described in detail below with reference to the accompanying drawings. It should be noted that the features in the embodiments and the embodiments in the present application may be combined with each other in any manner without conflict.

The steps illustrated in the flowchart of the accompanying drawings may be executed in a computer system such as a set of computer executable instructions. Also, although logical sequences are shown in the flowcharts. In some cases the steps shown or described may be performed in a different order than that described herein.

Unless otherwise defined, technical terms or scientific terms used in the disclosure of the embodiments of the present disclosure should be construed in the ordinary meaning of the ordinary skill of the present disclosure. The terms "first", "second", and similar terms used in the embodiments of the present disclosure do not denote any order, quantity, or importance, but are merely used to distinguish different components. The word "include", "comprise", or the like means that the element or item that precedes the word includes the element or the item and its equivalent that is recited after the word, and does not exclude other element or item. The words "connected to" or "connected with" and the like are not limited to physical or mechanical connections, but may include electrical connections, whether direct or indirect. "Upper", "lower", "left", "right", etc. are only used to indicate relative positional relationships and, when the absolute position of the object being described is changed, the relative positional relationship may also change accordingly.

According to the inventor's research, the existing eye tracking module for implementing the eye tracking technology keeps tracking the eyeball once it starts working, even when eye tracking is not required. It will keep tracking, making the existing eye tracking module unable to be controlled in real time, which results in waste of computing resources. In addition, the existing eye tracking module occupies a large volume, which cannot meet the requirement of an overall thin size of the eye tracking module.

The embodiments of the present disclosure are described in detail below as applied to a scenario of human-computer interaction for example. However, the embodiments of the present disclosure are not limited thereto, and the embodiments of the present disclosure can also be applied to other fields, such as virtual reality, augmented reality, vehicle assisted driving, user experience, cognitive impairment diagnosis, and the like. Further, although the specific embodiments are described below by taking a human user as an example, the embodiments of the present disclosure are not limited thereto. In fact, the technical solution according to the embodiments of the present disclosure can also be applied to other animals or non-living bodies having similar eye features.

The embodiments of the present disclosure provide a light guiding component and a manufacturing method thereof, an eyeball tracking module and method, and video eyeglasses (also referred to herein in the singular form as a "video eyeglass"). The eyeball tracking module can be disposed in a virtual reality glasses device or an augmented reality glasses device, and can implement eyeball tracking through uniquely designed internal structure of the video eyeglass, such that when the user wears the glasses device to view a display terminal located in front of the glasses, the user can perform operation control on the display terminal based on the eyeball tracking technology, and realize functions such as human-computer interaction and gaze point rendering.

FIG. 1 is a schematic structural diagram of a light guiding component according to an embodiment of the present disclosure. As shown in FIG. 1, a light guiding component provided in an embodiment of the present disclosure is provided in an eyeball tracking module, and includes: a first substrate 1 and a second substrate 2 disposed opposite to each other, a first electrode 3 disposed on the first substrate 1, a second electrode 4 disposed on the second substrate 2, and at least one liquid crystal structure 5 disposed between the first electrode 3 and the second electrode 4. The liquid crystal structure 5 includes liquid crystal molecules (not shown in the figure).

The first electrode 3 and the second electrode 4 are configured to control a deflection direction of the liquid crystal molecules with an applied voltage, so that a light ray incident to the light guiding component that meets a threshold condition is emitted out along a predetermined direction.

It should be noted that a light ray incident to the light guiding component which does not meet the threshold condition is transmitted through the light guiding component.

In an example embodiment, the material of the first substrate 1 may be glass, plastic, polyimide, or the like, which is not limited in the embodiments of the present disclosure.

In an example embodiment, the material of the second substrate 2 may be glass, plastic, polyimide, or the like, which is not limited in the embodiments of the present disclosure.

It should be noted that the materials of the first substrate 1 and the second substrate 2 may be the same or different.

In an example embodiment, the number of the liquid crystal structures 5 is at least one, as illustrated in FIG. 1, by taking two liquid crystal structures as an example, which is not limited in the embodiments of the present disclosure.

In an example embodiment, the liquid crystal structure 5 is made of a photosensitive liquid crystal polymer.

Specifically, the threshold condition in this embodiment refers to an incident angle of the light ray being equal to a threshold angle. It should be noted that the threshold angles for different liquid crystal structures are different. Specifically, when a light ray satisfying the threshold condition is incident to the liquid crystal structure, diffraction constructive interference may occur, so that the light ray is emitted out in a predetermined direction to illuminate the eyeball of the user. In an embodiment of the present disclosure, by disposing at least one liquid crystal structure, more light rays can be diffracted in the light guiding component so that the light rays are emitted out in a predetermined direction.

The incident angle of the light ray and an angle between the incident direction of the light and the first substrate.

Specifically, the predetermined directions in which different liquid crystal structures emit light rays are also different. However, regardless of the angles of the predetermined direction, the light rays are all emitted out toward the direction of the user's eyeball, only with different emitting angles.

In this embodiment, depending on the size of the applied voltage, the deflection angle of the liquid crystal molecules varies. On one hand, the light guiding direction of the light guiding component can be controlled by controlling the deflection angle of the liquid crystal molecules so that objects in different light emitting directions, such as eyes, can receive light rays emitted out and can reflect off the received light rays. On the other hand, by controlling the deflection angle of the liquid crystal molecules, the light guiding component can no longer emit out light rays so that it does not have a light guiding effect, and the object in the light emitting direction cannot receive light rays emitted outwards.

The light guiding component provided in the embodiment of the present disclosure is provided in an eyeball tracking module, and includes: a first substrate and a second substrate disposed opposite to each other, a first electrode disposed on the first substrate, a second electrode disposed on the second substrate, and at least one liquid crystal structure disposed between the first electrode and the second electrode. The liquid crystal structure 5 includes liquid crystal molecules. The first electrode and the second electrode are configured to control a deflection direction of the liquid crystal molecules with an applied voltage, so that a light ray incident to the light guiding component which meets a threshold condition is emitted out along a predetermined direction. In the embodiment of the present disclosure, by providing a light guiding component in an eyeball tracking module, not only the light rays can be emitted out along a predetermined direction, which can reduce the number of light sources required in the eyeball tracking module and, in turn, reduce the occupied volume of the eyeball tracking module, and satisfy the requirement of the overall thin size of the eye tracking module, but also can control the deflection direction of the liquid crystal molecules through the first electrode and the second electrode to control the direction of light emission, thereby realizing real-time controllability of the eyeball tracking module, and saving resources.

Figure 2:
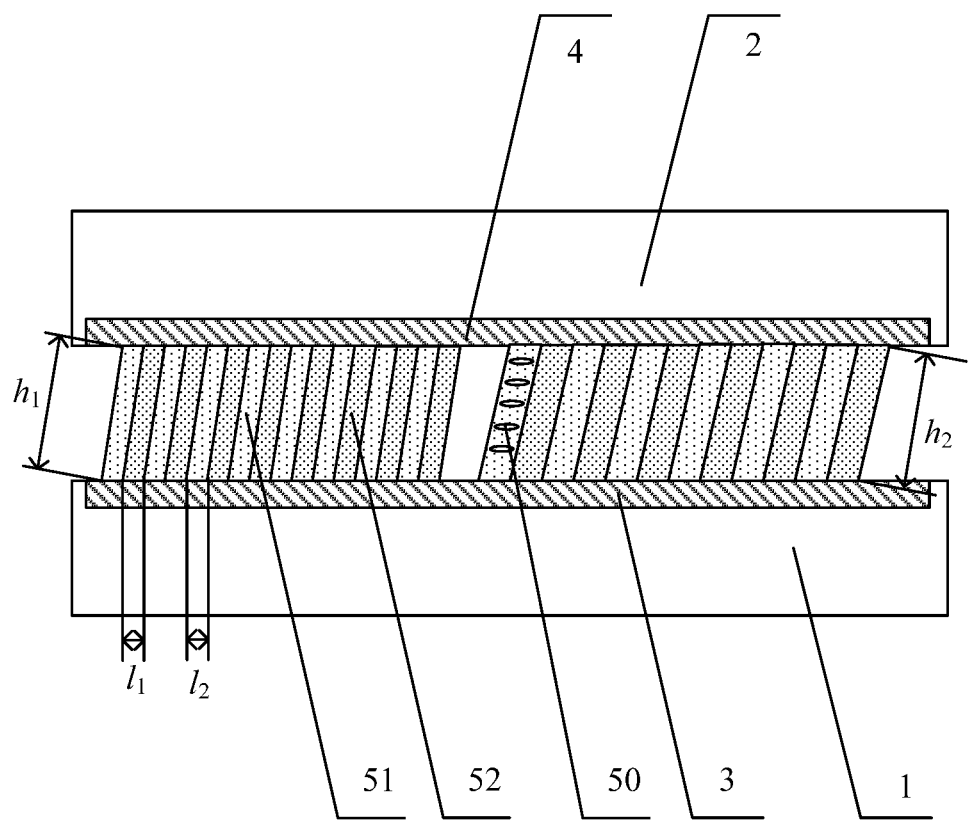
FIG. 2 is a schematic structural diagram of a light guiding component according to an embodiment of the present disclosure.

In an example embodiment, FIG. 2 is a schematic structural diagram of a light guiding component according to an embodiment of the present disclosure. As shown in FIG. 2, each liquid crystal structure 5 provided by the embodiment of the present disclosure includes: a first liquid crystal cells 51 arranged in an array and a second liquid crystal cells 52 arranged in an array.

Specifically, the first liquid crystal cells 51 and the second liquid crystal cells 52 are parallel to each other and disposed obliquely with respect to the first substrate. The angle between the first liquid crystal cells 51 and the first substrate is an acute angle. The angle between the second liquid crystal cells 52 and the first substrate is an acute angle. The first liquid crystal cells 51 and the second liquid crystal cells 52 are alternately disposed.

Specifically, a refractive index of the first liquid crystal cell 51 is greater than a refractive index of the second liquid crystal cell 52.

It should be noted that the plurality of first liquid crystal cells are parallel to each other and separated by the second liquid crystal cells. That is, the plurality of first liquid crystal cells form one grating and, in addition, the plurality of second liquid crystal cells are parallel to each other and are separated by the first liquid crystal cells. That is, the plurality of second liquid crystal cells form another grating. Therefore, the light guiding component in the embodiment is formed by staggering two gratings which can improve the light modulation capability of the light guiding component. In addition, the first liquid crystal cells and the second liquid crystal cells are disposed in an inclined manner such that the light rays emitted from the light guiding component have a certain angle. The embodiment of the present disclosure does not specifically limit the inclined angles of the first liquid crystal cells and the second liquid crystal cells, and they may be specifically determined depending on actual requirements.

Specifically, the arrays in this embodiment are arranged in a periodic strip arrangement, and the period is determined according to actual requirements which is not limited in the embodiment of the present disclosure.

Specifically, FIG. 2 is an example in which two liquid crystal structures are included in the light guiding component, which is not limited by the embodiment of the present disclosure.

In addition, different liquid crystal structures refer to different inclination angles of the first liquid crystal cells with respect to the first substrate and/or different intervals between adjacent first liquid crystal cells.

In an example embodiment, the interval 11 between adjacent first liquid crystal cells is 1 to 10 nanometers, and the interval 12 between adjacent second liquid crystal cells is 1 to 10 nanometers.

In an example embodiment, the thickness h1 of the first liquid crystal cell 51 is 2 to 10 micrometers.

In an example embodiment, the thickness h2 of the second liquid crystal cell 52 is 2-10 micrometers.

In an example embodiment, the first liquid crystal cell includes a first liquid crystal molecule 50, and the second liquid crystal cell includes a second liquid crystal molecule (not shown). The first liquid crystal molecules and the second liquid crystal molecules are made of different materials.

In an example embodiment, as shown in FIG. 1 and FIG. 2, in the embodiment of the present disclosure, the first electrode 3 is disposed on a side of the first substrate 1 adjacent to the second substrate 2, and the second electrode 4 is disposed on a side of the second substrate 2 adjacent to the first substrate 1.

Specifically, the first electrode 3 and the second electrode 4 are both transparent electrodes.

In an example embodiment, the material of the first electrode 3 and the second electrode 4 may be a transparent conductive material, such as indium tin oxide, graphene, or nanotubes, which is not limited in the embodiment of the present disclosure.

Figure 3:
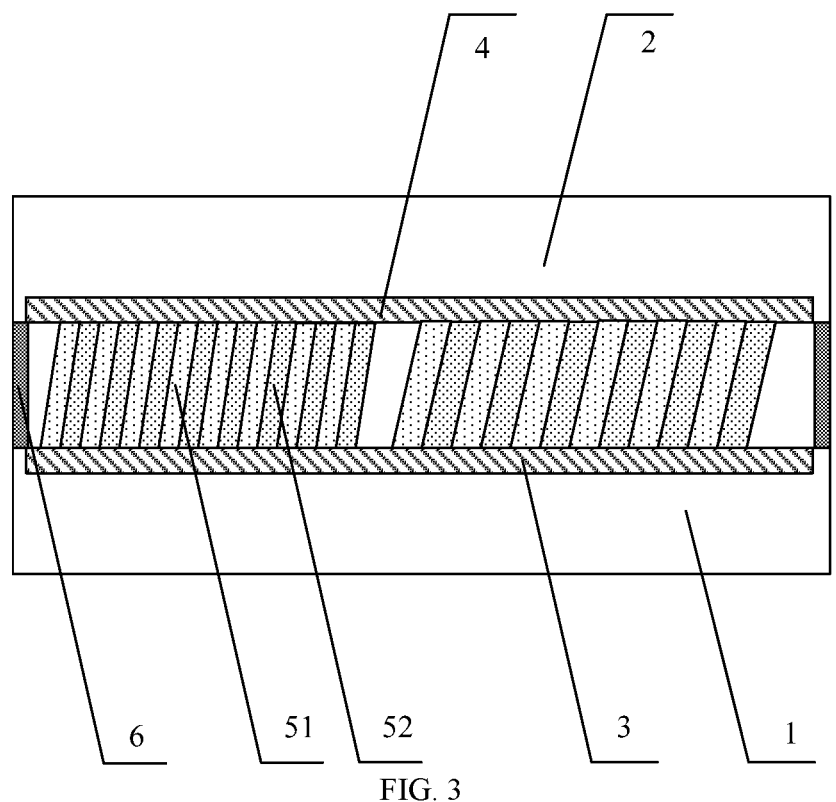
FIG. 3 is a schematic structural diagram of a light guiding component according to an embodiment of the present disclosure.

In an example embodiment, FIG. 3 is a schematic structural diagram of a light guiding component according to an embodiment of the present disclosure. As shown in FIG. 3, the light guiding component provided by the embodiment of the present disclosure further includes a sealant 6 between the first substrate 1 and the second substrate 2.

Specifically, the sealant 6 is used to bond the first substrate 1 and the second substrate 2.

Figure 4:
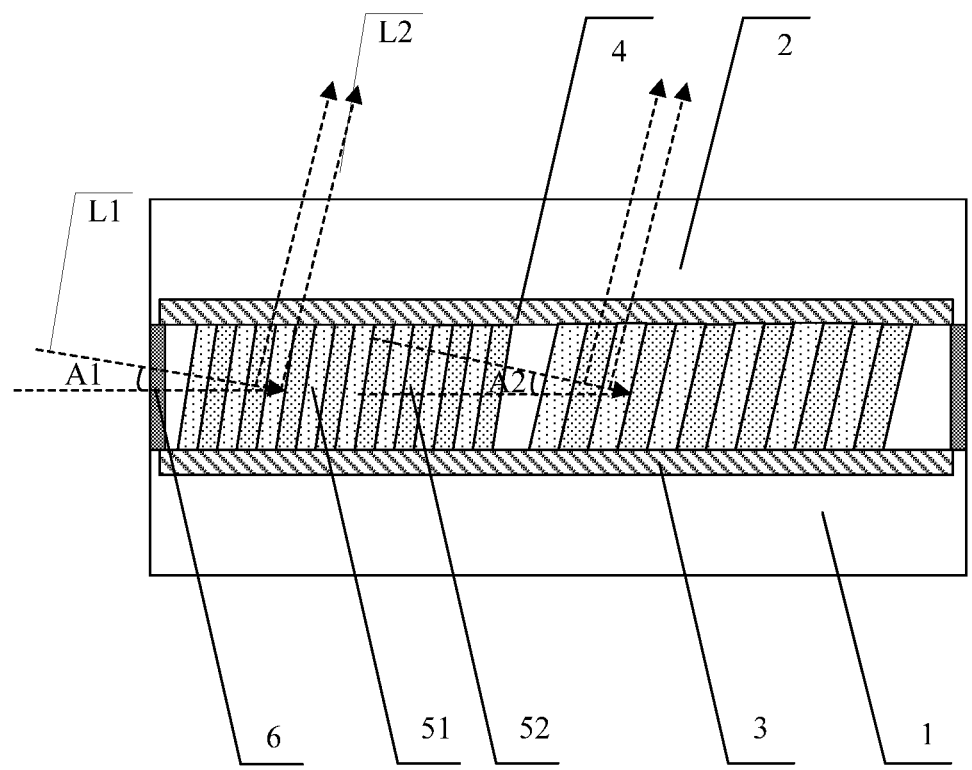
FIG. 4 is a diagram of an optical path of a light guiding component according to an embodiment of the present disclosure.

Referring to this embodiment, FIG. 4 is a diagram of an optical path of a light guiding component according to an embodiment of the present disclosure. As shown in FIG. 4, the light guiding component includes two liquid crystal structures, where a threshold angle of a liquid crystal structure is A1 and a threshold angle of the other liquid crystal structure is A2, and A1 and A2 are not equal.

As shown in FIG. 4, the incident light ray L1 is incident from a light source (not shown) disposed at an edge of the light guiding component, and the light ray satisfying the threshold condition is emitted out through the light guiding component along a predetermined direction. Specifically, a light ray with an incident angle A1 incident to the liquid crystal structure corresponding to the threshold angle A1 is emitted outwards along a predetermined direction, and a light ray with an incident angle A2 incident to the liquid crystal structure corresponding to the threshold angle A2 is emitted outwards along a predetermined direction.

Figure 5:
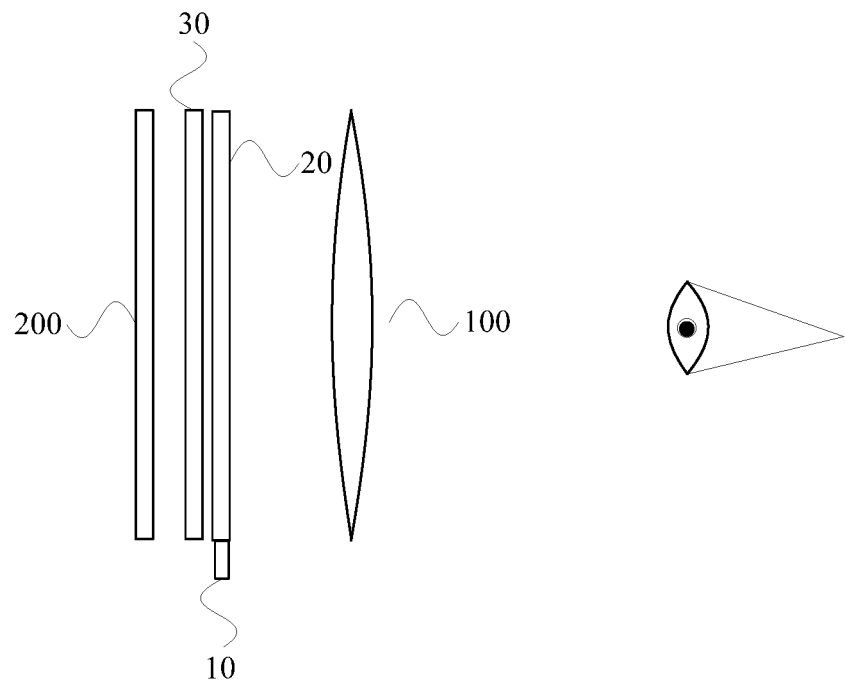
FIG. 5 is a schematic structural diagram of an eyeball tracking module according to an embodiment of the present disclosure.

Based on the concept of the above embodiment, FIG. 5 is a schematic structural diagram of an eyeball tracking module according to an embodiment of the present disclosure. As shown in FIG. 5, an embodiment of the present disclosure further provides an eyeball tracking module, which is disposed in video eyeglasses. The eyeball tracking module includes a transmitting component 10, a light guiding component 20, a receiving component 30, and a main control component (not shown).

Specifically, the transmitting component 10 is configured to emit invisible light to the light guiding component 20. The light guiding component 20 is configured to emit out the invisible light incident to the light guiding component along a predetermined direction. The receiving component 30 is configured to receive the invisible light reflected off the eyeball, and generate an electrical signal under the illumination of invisible light. The main control component is configured to receive the electrical signal and obtain the position of the eyeball according to the electrical signal.

The video eyeglasses may be a virtual reality glasses device or an augmented reality glasses device. It should be noted that as shown in FIG. 5, the video eyeglasses further includes: a lens 100 disposed in the video eyeglass and a display terminal 200 viewed by the user. The lens 100 is fixedly disposed on the transmission optical path between the eyeball and the display terminal 200, where the outer edge of the lens 100 is located at the edge or outside of the viewing angle of the video eyeglass for assisting in adjusting the focal length.

In an example embodiment, the lens 100 may be of various types, such as a plano-convex lens, a symmetrical or asymmetrical lenticular lens, or a meniscus lens. The embodiment of the present disclosure does not limit the type of the lens and FIG. 5 illustrates the lens 100 as a convex lens, for example.

In an example embodiment, the display terminal 200 may allow a user to view visual data or other visual data, such as a game screen or the like, provided by a head mounted virtual reality device or a head mounted augmented reality device. By way of example only, such display terminal may include a LCD screen, a LED screen, an OLED screen, a projector, and/or other display technology, such as a cell phone screen or a tablet screen.

Specifically, the main control component specifically calculates the direction of the light ray reflected off the eyeball of the user to the receiving component and, in turn, obtains the position of the eyeball according to the position where the electrical signal is generated, the light emitting direction of the light guiding component, the position of the receiving component, the position of the light guiding component, and the distance between the user's eyeball and the receiving component.

Specifically, the light guiding component in the embodiment of the present disclosure is the light guiding component provided in the first embodiment, and the implementation principle and the implementation effect thereof are similar.

The eyeball tracking module provided in the embodiment of the present disclosure is disposed in the video eyeglass, and includes: a transmitting component, a light guiding component, a receiving component, and a main control component. The transmitting component is configured to emit invisible light to the light guiding component. The light guiding component is configured to emit out the invisible light incident to the light guiding component along a predetermined direction. The receiving component is configured to receive the invisible light reflected off the eyeball, and generate an electrical signal under the illumination of invisible light. The main control component is configured to receive the electrical signal and obtain the position of the eyeball according to the electrical signal. In an embodiment of the present disclosure, by providing a light guiding component in the eyeball tracking module, not only can the light rays be emitted out along a predetermined direction, which can reduce the number of light sources required in the eyeball tracking module and, in turn, reduce the occupied volume of the eyeball tracking module, and satisfy the requirement of the overall thin size of the eye tracking module, but also can control the deflection direction of the liquid crystal molecules through the first electrode and the second electrode to control the direction of light emission, thereby realizing real-time controllability of the eyeball tracking module and saving computational resources.

In an example embodiment, as shown in FIG. 5, the transmitting component 10 includes: at least one invisible light source disposed at an edge of the light guiding component 20 and connected to the main control component.

Specifically, the on/off state of the invisible light source is controlled by the main control component.

In this embodiment, since the light guiding component is disposed, the transmitting component can be disposed at the edge of the light guiding component and the light ray may be emitted to the eyeball through the light guiding component without blocking the user's sight or view.

In an example embodiment, the invisible light source includes an infrared light source and, specifically, a light emitting diode (LED) light source.

In an example embodiment, the shape of the invisible light source may be a ring shape, a triangle shape, a square shape, a rectangular shape, an elliptical shape, a hyperbolic shape, or any other regular or irregular shape, which is not limited in the embodiment of the present disclosure.

It should be noted that the eyeball may reflect invisible light, thereby forming a reflection point on the eyeball. Specifically, since the wavelength that the human eye can perceive is 380 nm to 780 nm, in order not to affect people's normal viewing of the display terminal, the invisible light source may be an infrared light source with low sensitivity and which is less harmfulness to the human eye.

In an example embodiment, as shown in FIG. 5, the light guiding component 20 is disposed on one side of the lens 100 and the receiving assembly 30 is disposed on a side of the light guiding component 20 away from the lens 100.

Specifically, the light guiding component 20 is disposed on a side of the lens 100 adjacent to the display terminal 200.

In the embodiment of the present disclosure, the light guiding component and the receiving component are disposed between the lens and the display terminal, thereby it can further reduce the occupied volume of the eyeball tracking module.

In addition, although the invisible light reflected from the eyeball is first incident on the light guiding component, the light ray that is incident on the light guiding component does not satisfy the threshold condition and, since the light guiding component is transmissive to the light ray that does not satisfy the threshold condition, the receiving component 30 disposed at the side of the light guiding component 20 away from the lens does not affect the receiving component receiving invisible light.

Figure 6:
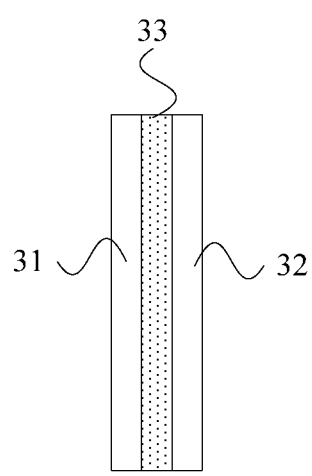
FIG. 6 is a schematic structural diagram of a receiving component according to an embodiment of the present disclosure.

In an example embodiment, FIG. 6 is a schematic structural diagram of a receiving component according to an embodiment of the present disclosure. As shown in FIG. 6, the receiving component 30 in the eyeball tracking module provided by the embodiment of the present disclosure includes: a third electrode 31 and a fourth electrode 32 disposed opposite to each other, and a photosensitive layer 33 disposed between the third electrode 31 and the fourth electrode 32.

Specifically, the photosensitive layer 33 is configured to generate an electrical signal under illumination of invisible light. The third electrode 31 and the fourth electrode 32 are connected to the main control component and configured to transmit the electrical signal to the main control component.

In an example embodiment, in order to not affect the optical path of the visible light, the third electrode 31 is a transparent electrode, and the material thereof is indium tin oxide, nanotubes, or graphene, which is not limited in the embodiment of the present disclosure.

In an example embodiment, in order to not affect the optical path of the visible light, the fourth electrode 32 is a transparent electrode, and the material thereof is indium tin oxide, nanotubes, or graphene, and the like, which is not limited in the embodiment of the present disclosure.

In an example embodiment, the photosensitive layer 33 includes at least one PN junction.

Specifically, after the invisible light reflected by the eyeball is received by the photosensitive layer 33, the equilibrium state of the PN junction in the photosensitive layer is changed, electron migration occurs, and a voltage is generated. The voltage is transmitted by the third electrode 31 and the fourth electrode 34 to the main control component, and the main control component obtains the position where the photosensitive layer receives the infrared light according to the generated position of the received voltage. Specifically, the main control component calculates the direction of the light ray reflected off the eyeball of the user to the receiving component and in turn, obtains the position of the eyeball according to the position where the electrical signal is generated, the light emitting direction of the light guiding component, the position of the receiving component, the position of the light guiding component, and the distance between the user's eyeball and the receiving component.

In an example embodiment, the light guiding component includes a first electrode and a second electrode; and the first electrode and the second electrode are connected to the main control component.

Specifically, the main control component controls signals applied to the first electrode and the second electrode.

It should be noted that the main control component specifically applies a signal to the entire first electrode and the entire second electrode. When the light guiding component includes one liquid crystal structure, the main control component obtains the position of the eyeball according to the position where the electrical signal is generated, the light emitting direction of the light guiding component, the position of the receiving component, the position of the light guiding component, and the distance between the user's eyeball and the receiving component. When the light guiding component includes a plurality of liquid crystal structures, the main control component determines a plurality of possible positions of the eyeball according to the light emitting direction of each light guiding component, the position where the electrical signal is generated, the position of the receiving component, the position of the light guiding component, and determines the position of the eyeball from the plurality of possible positions of the eyeball according to the distance between the user's eyeball and the receiving component.

In an example embodiment, when the transmitting component is an invisible light source, the transmitting component is connected to the main control component through the first interface; wherein the first interface is a one-way interface that the main control component sends a control signal to the transmitting component.

The one-way interface represents an interface through which a signal can only be transmitted in one direction. The transmitting component cannot transmit a signal to the main control component through the first interface.

In an example embodiment, the first interface may also be an interface that has a power supply function at the same time.

In an example embodiment, the light guiding component is connected to the main control component through the second interface; wherein the second interface is a one-way interface for electrical signal transmission between the main control component and the light guiding component.

In an example embodiment, the receiving component is connected to the main control component through the third interface; wherein the third interface is a one-way interface for performing electrical signal transmission between the main control component and the receiving component.

Specifically, the main control component obtains the position of the eyeball according to the transmission path of the optical signal.

It should be emphasized that the main control component involved in the embodiments of the present disclosure may include components for performing computing tasks, such as a printed circuit board and other electronic devices; and may also be connected to an external smart device such as a mobile phone, a computer, a tablet computer, and may process image data by means of a processor such as a mobile phone, a computer and a tablet computer.

Specifically, when the transmitting component includes an invisible light source, the main control component is configured to control an on and off state of the transmitting component; and is further configured to receive the electrical signal. The main control component may process the electrical signal through an algorithm to obtain a position of a human eye gaze point. Alternatively, the main control component is configured to receive the electrical signal and transmit the electrical signal to a smart device for the smart device to process the electrical signal to obtain a position of a human eye gaze point. Then, the main control component is configured to receive the position of a human eye gaze point returned by the smart device and operate the display terminal based on the position of the gaze point, and realize functions such as human-computer interaction and gaze point rendering.

Figure 7:
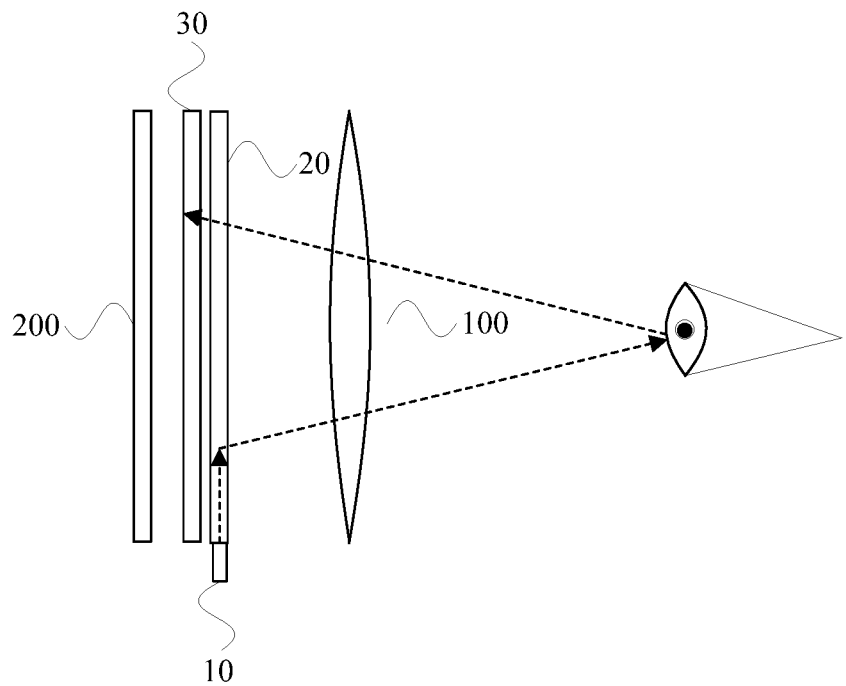
FIG. 7 is a diagram of an optical path of an eyeball tracking module according to an embodiment of the present disclosure.

FIG. 7 is a diagram of an optical path of an eyeball tracking module according to an embodiment of the present disclosure. As shown in FIG. 7, the optical path of the eyeball tracking module includes:

(1) the reflective component emitting invisible light to the light guiding component;

(2) the light guiding component emitting invisible light to the eyeball, and the eyeball reflecting invisible light; and (3) the receiving component receiving the invisible light reflected by the eyeball.

The working principle of the eyeball tracking module provided by the embodiments of the present disclosure is further described below.

When eyeball tracking is required, the main control component applies a voltage to the first electrode and the second electrode to deflect the liquid crystal molecules in the light guiding component. The main control component controls the transmitting component to be turned on, and the transmitting component emits invisible light to the light guiding component. The receiving component receives the invisible light reflected off the eyeball, to generate an electrical signal. The main control obtains the position of the eyeball according to the electrical signal. When eyeball tracking is not required, the main control component applies a voltage to the first electrode and the second electrode to deflect the liquid crystal molecules in the light guiding component, such that the light guiding component does not emit invisible light to the eyeball.

Figure 8:
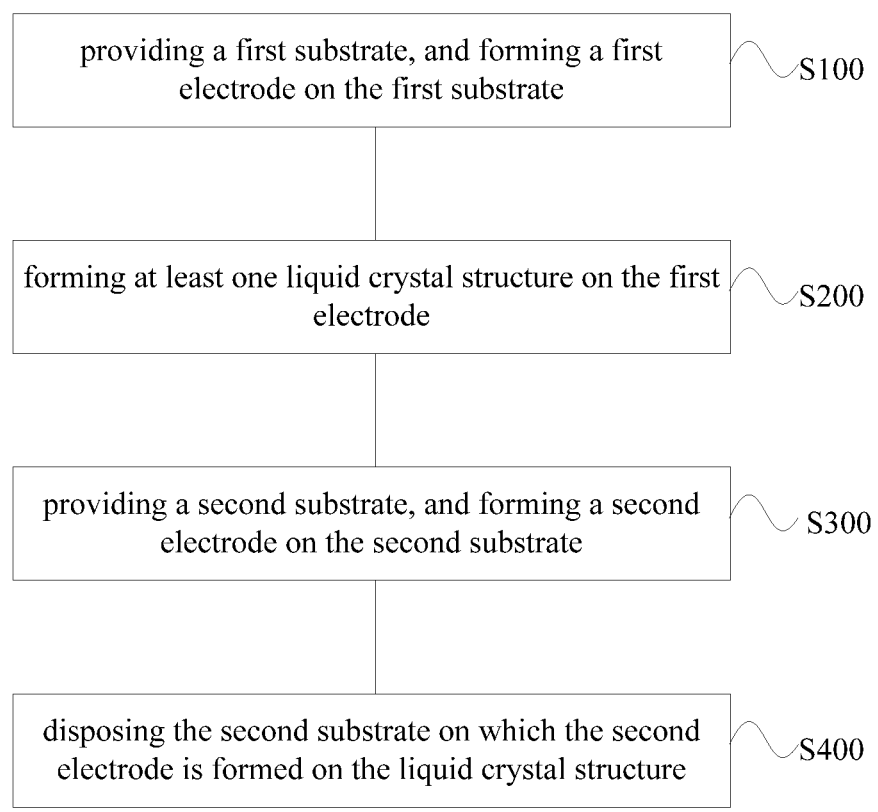
FIG. 8 is a flowchart of a method for manufacturing a light guiding component according to an embodiment of the present disclosure.

Based on the above embodiments, FIG. 8 is a flowchart of a method for manufacturing a light guiding component according to an embodiment of the present disclosure. As shown in FIG. 8, a method for manufacturing a light guiding component according to an embodiment of the present disclosure includes the following steps.

In step S100, a first substrate is provided, and a first electrode is formed on the first substrate.

In an example embodiment, the material of the first substrate may be glass, plastic, polyimide, or the like, which is not limited in the embodiment of the present disclosure.

Specifically, forming the first electrode on the first substrate includes: forming a groove on the first substrate by a laser process or a photolithography process, depositing a transparent conductive film in the groove, and processing the transparent conductive film by a patterning process to form a first electrode.

In an example embodiment, the transparent conductive film may be a transparent conductive material such as indium tin oxide, graphene or nanotubes, which is not limited in the embodiment of the present disclosure.

It should be noted that the patterning process includes: photoresist coating, exposure, development, etching, photoresist stripping, and the like.

In step S200, at least one liquid crystal structure is formed on the first electrode.

Specifically, the step S200 specifically includes: coating a liquid crystal material including a first liquid crystal material and a second liquid crystal material on the first electrode; and performing light exposure on the liquid crystal material with a mask to form at least one liquid crystal structure including the first liquid crystal cell and the second liquid crystal cell.

Coating the first liquid crystal material and the second liquid crystal material on the first electrode includes: coating a first liquid crystal material on the first electrode, and coating a second liquid crystal material between the first liquid crystal materials.

The first liquid crystal cell and the second liquid crystal cell are parallel to each other and are disposed obliquely with respect to the first substrate; the first liquid crystal cell and the second liquid crystal cell are alternately disposed.

A refractive index of the first liquid crystal material is greater than a refractive index of the second liquid crystal material.

In an example embodiment, the first liquid crystal material includes: a photosensitive liquid crystal polymer.

In an example embodiment, the second liquid crystal material includes: a photosensitive liquid crystal polymer.

Specifically, the liquid crystal material may undergo a curing reaction under illumination to form a liquid crystal structure in which the refractive index and the pitch are periodically changed.

It should be noted that the gaps of the masks corresponding to different liquid crystal structures are different, and the gaps in the masks are in nanometer-scales.

In an example embodiment, the number of the liquid crystal structures is at least one, which is not limited in the embodiment of the present disclosure.

In an example embodiment, the liquid crystal structure is made of a photosensitive liquid crystal polymer.

In step S300, a second substrate is provided, and a second electrode is formed on the second substrate.

In an example embodiment, the material of the second substrate may be glass, plastic, or polyimide, which is not limited in the embodiment of the present disclosure.

It should be noted that the materials for manufacturing the first substrate and the second substrate may be the same or different.

Specifically, forming the second electrode on the second substrate includes: forming a groove on the second substrate by a laser process or a photolithography process, depositing a transparent conductive film in the groove, and processing the transparent conductive film by a patterning process to form the second electrode.

In an example embodiment, the transparent conductive film may be a transparent conductive material such as indium tin oxide, graphene, or nanotubes, which is not limited in the embodiment of the present disclosure.

Specifically, the first electrode and the second electrode are configured to control the deflection direction of the liquid crystal molecules with an applied voltage, so that a light ray incident to the light guiding component, which meets a threshold condition, is emitted outwards along a predetermined direction.

In step S400, the second substrate is disposed on the liquid crystal structure, wherein the second electrode is formed on the second substrate.

Specifically, the side on which the second electrode is disposed is adjacent to the liquid crystal structure.

A method for manufacturing a light guiding component according to an embodiment of the present disclosure includes: providing a first substrate; forming a first electrode on the first substrate; forming at least one liquid crystal structure on the first electrode; providing a second substrate; and forming a second electrode on the second substrate. The first electrode and the second electrode are configured to control a deflection direction of the liquid crystal molecules with an applied voltage, so that a light ray incident to the light guiding component which meets a threshold condition is emitted out along a predetermined direction. In the embodiment of the present disclosure, by providing a light guiding component in an eyeball tracking module, not only the light rays can be emitted out along a predetermined direction, which can reduce the number of light sources required in the eyeball tracking module, and in turn, reduce the occupied volume of the eyeball tracking module, and satisfy the requirement of the overall thin size of the eye tracking module, but also can control the deflection direction of the liquid crystal molecules through the first electrode and the second electrode to control the direction of light emission, thereby realizing real-time controllability of the eyeball tracking module, and saving resources.

In an example embodiment, after the step S400, the method for manufacturing the light guiding component provided by the embodiment of the present disclosure further includes: coating a sealant for bonding the first substrate and the second substrate between the first substrate and the second substrate.

The method for manufacturing the light guiding component according to the embodiment of the present disclosure is further described below with reference to FIGS. 9A-9F.

Figure 9A:
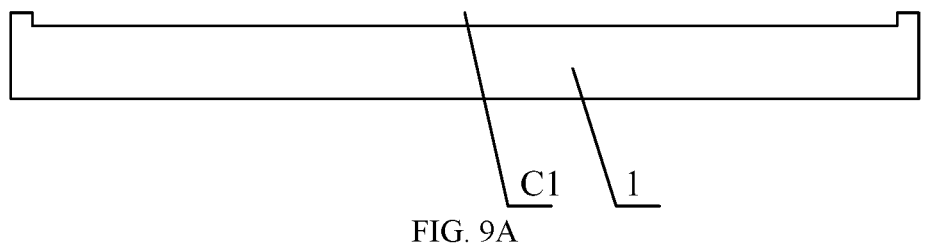
FIG. 9A is a schematic diagram of a method for manufacturing a light guiding component according to an embodiment of the present disclosure.

In step S510, a first substrate 1 is provided, and a first groove C1 is formed on the first substrate 1 by a laser process or a photolithography process, as shown in FIG. 9A.

Figure 9B:
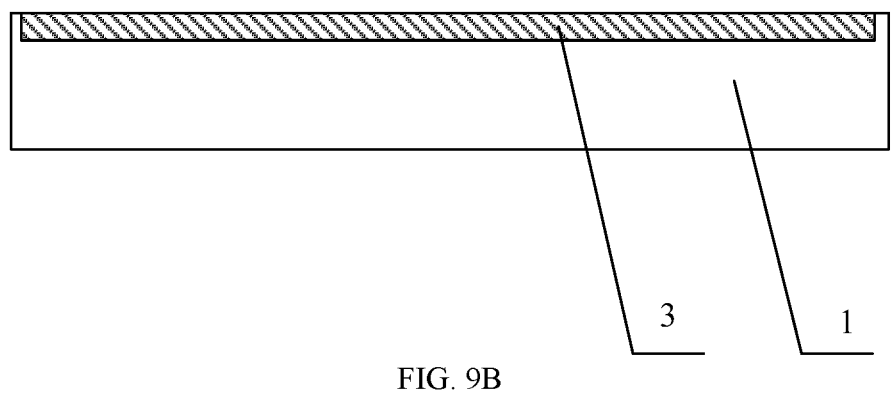
FIG. 9B is a schematic diagram of a method for manufacturing a light guiding component according to an embodiment of the present disclosure.

In step S520, a transparent conductive film is deposited in the first groove, and a first electrode 3 is formed by a patterning process, as shown in FIG. 9B.

Figure 9C:
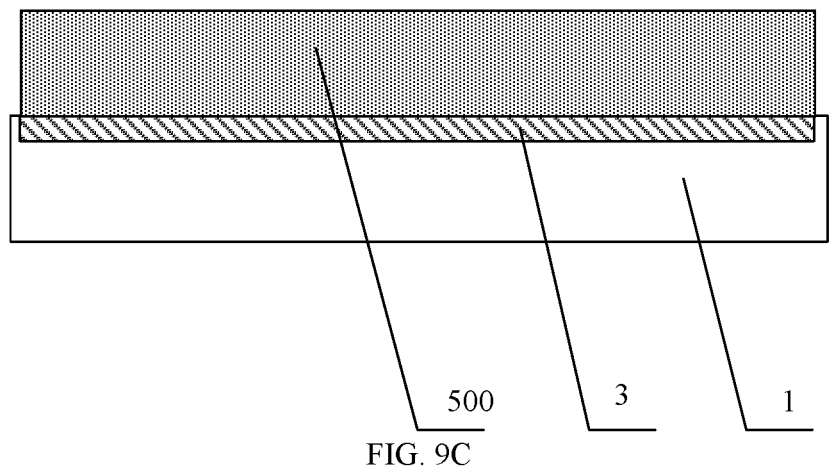
FIG. 9C is a schematic diagram of a method for manufacturing a light guiding component according to an embodiment of the present disclosure.

In step S530, a liquid crystal material 500 including a first liquid crystal material and a second liquid crystal material is coated on the first electrode 3, as shown in FIG. 9C.

Figure 9D:
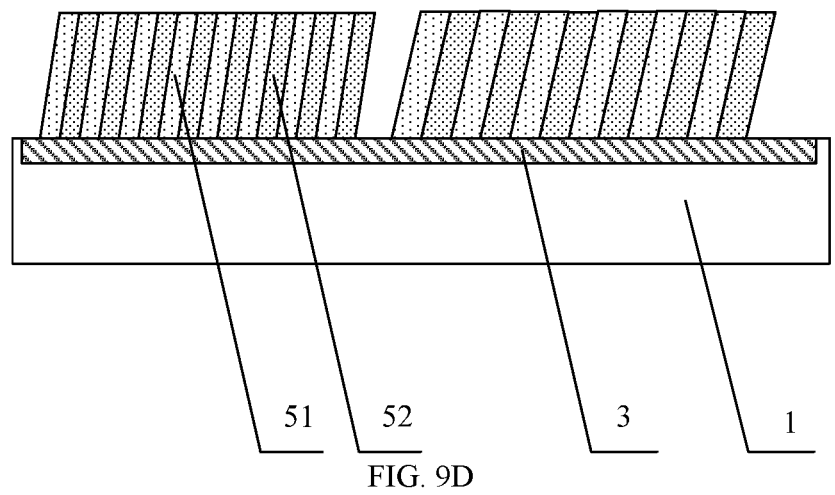
FIG. 9D is a schematic diagram of a method for manufacturing a light guiding component according to an embodiment of the present disclosure.

In step S540, the liquid crystal material is exposed to light with the mask 7 to form at least one liquid crystal structure including the first liquid crystal cell 51 and the second liquid crystal cell 52, as shown in FIG. 9D.

Specifically, FIG. 9D illustrates two liquid crystal structures as an example. The widths of the gaps of the masks corresponding to the two liquid crystal structures are different, and the angles of illumination are also different.

Figure 9E:
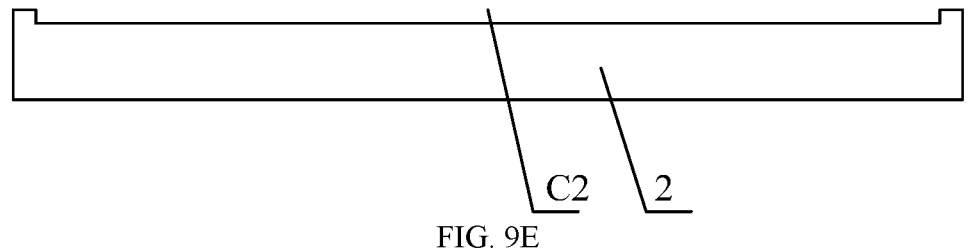
FIG. 9E is a schematic diagram of a method for manufacturing a light guiding component according to an embodiment of the present disclosure.

In step S550, a second substrate 2 is provided, a second groove C2 is formed on the second substrate 1 by a laser process or a photolithography process, as shown in FIG. 9E.

Figure 9F:
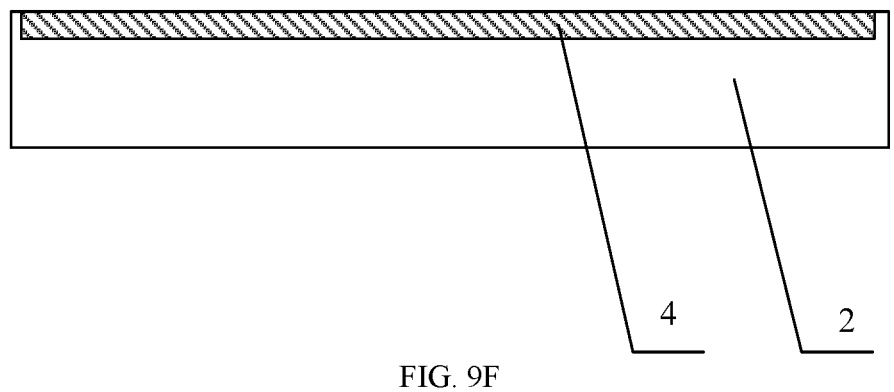
FIG. 9F is a schematic diagram of a method for manufacturing a light guiding component according to an embodiment of the present disclosure.

In step S560, a transparent conductive film is deposited in the second groove, and a second electrode 4 is formed by a patterning process, as shown in FIG. 9F.

In step S570, the second substrate 2 on which the second electrode 4 is formed is disposed on the liquid crystal structure 5, as shown in FIG. 2.

In step S580, a sealant 6 for bonding the first substrate 1 and the second substrate 2 is applied between the first substrate 1 and the second substrate 2, as shown in FIG. 3.

Figure 10:
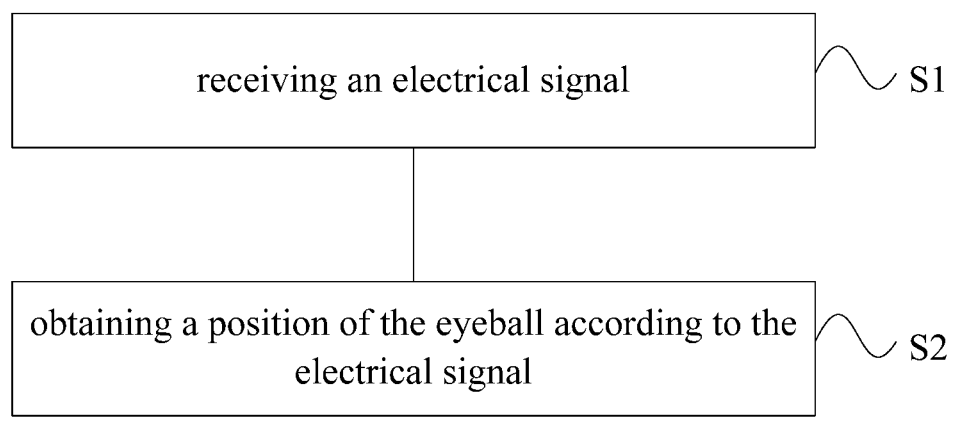
FIG. 10 is a flowchart of an eyeball tracking method according to an embodiment of the present disclosure.

Based on the inventive concept of the above embodiments, FIG. 10 is a flowchart of an eyeball tracking method according to an embodiment of the present disclosure, which is implemented with the eyeball tracking module provided in the second embodiment. The eyeball tracking module includes: a transmitting component and a light guiding component, a receiving component and a main control component, as shown in FIG. 10. The eyeball tracking method provided by the embodiment of the present disclosure specifically includes the following steps.

In step S1: an electrical signal is received.

In step S2, a position of the eyeball is obtained according to the electrical signal.

Specifically, the step S2 specifically includes: calculating the direction of the light ray reflected off the eyeball of the user to the receiving component and in turn, obtains the position of the eyeball according to the position where the electrical signal is generated, the light emitting direction of the light guiding component, the position of the receiving component, the position of the light guiding component, and the distance between the user's eyeball and the receiving component.

It should be noted that the main control component applies a signal to the light guiding component. When the light guiding component includes one liquid crystal structure, the main control component obtains the position of the eyeball according to the position where the electrical signal is generated, the light emitting direction of the light guiding component, the position of the receiving component, the position of the light guiding component, and the distance between the user's eyeball and the receiving component. When the light guiding component includes a plurality of liquid crystal structures, the main control component determines a plurality of possible positions of the eyeball according to the light emitting direction of each light guiding component, the position where the electrical signal is generated, the position of the receiving component, the position of the light guiding component, and determines the position of the eyeball from the plurality of possible positions of the eyeball according to the distance between the user's eyeball and the receiving component.

The eyeball tracking method provided by the embodiment of the present disclosure is implemented with the eyeball tracking module provided in the second embodiment. The method includes: receiving an electrical signal; and obtaining an eyeball position according to the electrical signal. Through the embodiment of the present disclosure, not only the light rays can be emitted out along a predetermined direction, which can reduce the number of light sources required in the eyeball tracking module, and in turn, reduce the occupied volume of the eyeball tracking module, and satisfy the requirement of the overall thin size of the eye tracking module, but also can control the deflection direction of the liquid crystal molecules through the first electrode and the second electrode to control the direction of light emission, thereby realizing real-time controllability of the eyeball tracking module, and saving resources.

Based on the inventive concept of the above embodiments, an embodiment of the present disclosure further provides video eyeglass. The video eyeglass include: an eyeball tracking module.

In an example embodiment, the video eyeglass include: virtual reality glasses or augmented reality glasses.

The eyeball tracking module in the embodiment is the eyeball tracking module provided in the second embodiment, and the implementation principle and the implementation effect thereof are similar, details of which will not be repeated herein.

The drawings of the embodiments of the present disclosure relate only to the structures involved in the embodiments of the present disclosure, and other structures may refer to the general design.

For the sake of clarity, the thickness and size of the layers or microstructures may be exaggerated in the figures for describing the embodiments of the present disclosure. It will be understood that when an element such as a layer, a film, a region, or a substrate is referred to as being "on" or "under" another element, the element may be "directly" "on" or "under" another element, or an intermediate element may be present.

In the case of no conflict, the embodiments of the present disclosure, that is, the features in the embodiments may be combined with each other to obtain a new embodiment.

While the embodiments of the present disclosure have been described above, the described embodiments are merely for the purpose of understanding the present disclosure and are not intended to limit the present disclosure. Any modification and variation in the form and to the details of the embodiments may be made by those skilled in the art without departing from the spirit and scope of the present disclosure. The protection scope of the present disclosure is still subject to the scope defined by the appended claims.

What is claimed is:

1. A light guiding component provided in an eyeball tracking module, the light guiding component comprising:
    a first substrate and a second substrate disposed opposite to each other;
    a first electrode disposed on the first substrate;
    a second electrode disposed on the second substrate;
    at least one liquid crystal structure disposed between the first electrode and the second electrode, the liquid crystal structure comprising liquid crystal molecules;
    first liquid crystal cells arranged in a first array and second liquid crystal cells arranged in a second array, wherein:
        the first liquid crystal cells and the second liquid crystal cells are parallel to each other and are disposed obliquely with respect to the first substrate;
        the first liquid crystal cells and the second liquid crystal cells are alternately disposed;
        a refractive index of the first liquid crystal cell is greater than a refractive index of the second liquid crystal cell; and
        the first electrode and the second electrode are configured to control a deflection direction of the liquid crystal molecules with an applied voltage such that a light ray incident to the light guiding component that meets a threshold condition is emitted along a direction.

2. The light guiding component according to claim 1, wherein the first electrode is disposed on a side of the first substrate adjacent to the second substrate.

3. The light guiding component according to claim 2, wherein:
    the second electrode is disposed on a side of the second substrate adjacent to the first substrate; and
    the first electrode and the second electrode are both transparent electrodes.

4. The light guiding component according to claim 1, wherein:
    the at least one liquid crystal structure is a plurality of liquid crystal structures;
    the threshold condition is a light incident angle being equal to a threshold angle of a respective one of the liquid crystal structures; and
    the threshold angle of individual ones of the liquid crystal structures are different.

5. The light guiding component according to claim 1, further comprising a sealant disposed between the first substrate and the second substrate, wherein the sealant is configured to bond the first substrate and the second substrate.

6. The light guiding component according to claim 1, wherein: an interval between adjacent first liquid crystal cells is 1 to 10 nanometers; and an interval between adjacent second liquid crystal cells is 1 to 10 nanometers.

7. An eyeball tracking module provided in video eyeglasses, the eyeball tracking module comprising:
the light guiding component according to claim 1;
a transmitting component configured to emit invisible light to the light guiding component;
a receiving component; and
a main control component;
wherein the light guiding component is configured to emit out the invisible light incident to the light guiding component along a predetermined direction;
wherein the receiving component is configured to receive the invisible light reflected off an eyeball and generate an electrical signal under illumination of the invisible light;
wherein the main control component is configured to receive the electrical signal and obtain a position of the eyeball according to the electrical signal; and
wherein the receiving component comprises a third electrode and a fourth electrode disposed opposite to each other, and a photosensitive layer disposed between the third electrode and the fourth electrode, the photosensitive layer being configured to generate an electrical signal under illumination of invisible light; and
wherein the third electrode and the fourth electrode are transparent electrodes connected to the main control component and configured to transmit the electrical signal to the main control component.

8. The eyeball tracking module according to claim 7, wherein the transmitting component comprises:
at least one invisible light source; and
the invisible light source is disposed at an edge of the light guiding component and is connected to the main control component.

9. The eyeball tracking module according to claim 7, wherein the video eyeglasses comprise:
a lens, wherein the light guiding component is disposed at one side of the lens;
wherein the receiving component is disposed on a side of the light guiding component away from the lens.

10. The eyeball tracking module according to claim 7, wherein the light guiding component comprises:
a first electrode and a second electrode; and
the first electrode and the second electrode are connected to the main control component.

11. The eyeball tracking module according to claim 7, wherein each liquid crystal structure comprises:
first liquid crystal cells arranged in a first array and second liquid crystal cells arranged in a second array, wherein:
the first liquid crystal cells and the second liquid crystal cells are parallel to each other and disposed obliquely with respect to the first substrate;
the first liquid crystal cells and the second liquid crystal cells are alternately disposed; and
a refractive index of the first liquid crystal cell is greater than a refractive index of the second liquid crystal cell.

12. The eyeball tracking module according to claim 7, wherein:
the first electrode is disposed on a side of the first substrate adjacent to the second substrate;
the second electrode is disposed on a side of the second substrate adjacent to the first substrate;
the first electrode and the second electrode are transparent electrodes.

13. The eyeball tracking module according to claim 7, wherein:
the at least one liquid crystal structure is a plurality of liquid crystal structures;
the threshold condition is a light incident angle being equal to a threshold angle; and
the threshold angle of individual ones of the liquid crystal structures are different.

14. The eyeball tracking module according to claim 7, wherein the video eyeglasses are configured to: receive an electrical signal; and obtain a position of an eyeball according to the electrical signal.

15. A method for manufacturing a light guiding component, comprising:
providing a first substrate;
forming a first electrode on the first substrate;
forming at least one liquid crystal structure on the first electrode, wherein the liquid crystal structure comprises liquid crystal molecules;
providing a second substrate;
forming a second electrode on the second substrate, wherein the first electrode and the second electrode are configured to control a deflection direction of the liquid crystal molecules with an applied voltage, such that a light ray incident to the light guiding component meeting a threshold condition is emitted along a predetermined direction; and
disposing the second substrate on which the second electrode is formed on the liquid crystal structure,
wherein forming at least one liquid crystal structure on the first electrode comprises:
coating a liquid crystal material comprising a first liquid crystal material and a second liquid crystal material on the first electrode; and
performing light exposure on the liquid crystal material with a mask to form a liquid crystal structure comprising the first liquid crystal cell and the second liquid crystal cell, wherein the first liquid crystal cell and the second liquid crystal cell are parallel to each other and disposed obliquely with respect to the first substrate; and
wherein the first liquid crystal cells and the second liquid crystal cells are alternately disposed.

16. The method according to claim 15, wherein, after the second substrate on which the second electrode is formed is disposed on the liquid crystal structure, the method further comprises coating a sealant for bonding the first substrate and the second substrate between the first substrate and the second substrate.

* * * * *